United States Patent [19]
Takagi et al.

[11] Patent Number: 4,809,030
[45] Date of Patent: Feb. 28, 1989

[54] CAMERA

[75] Inventors: Tadao Takagi, Yokohama; Toru Fukuhara, Isehara, both of Japan

[73] Assignee: Nikon Corporation, Tokyo, Japan

[21] Appl. No.: 98,394

[22] Filed: Sep. 18, 1987

[30] Foreign Application Priority Data

Sep. 24, 1986 [JP] Japan .................. 61-225570
Sep. 29, 1986 [JP] Japan .................. 61-230450

[51] Int. Cl.⁴ .................. G03B 15/05; G03B 7/00; G03B 7/28
[52] U.S. Cl. .................. 354/414; 354/416; 354/422; 354/432
[58] Field of Search .................. 354/414–417, 354/420–423, 431, 432

[56] References Cited

U.S. PATENT DOCUMENTS

| | | | |
|---|---|---|---|
| 4,331,400 | 5/1982 | Brownstein et al. | 354/417 X |
| 4,367,932 | 1/1983 | Ishikawa et al. | 354/415 |
| 4,429,969 | 2/1984 | Saegusa | 354/416 X |
| 4,530,585 | 7/1985 | Kanai | 354/416 |
| 4,572,644 | 2/1986 | Kataoka et al. | 354/416 X |
| 4,636,054 | 1/1987 | Saegusa | 354/432 |
| 4,690,536 | 9/1987 | Nakai et al. | 354/416 X |
| 4,705,382 | 11/1987 | Mukai et al. | 354/416 X |

Primary Examiner—W. B. Perkey
Attorney, Agent, or Firm—Shapiro and Shapiro

[57] ABSTRACT

A camera includes producing means for detecting the state of the luminance of the object field and producing a luminance information signal conforming to the detected state of the luminance of the object field, control means for calculating the exposure value for exposure of a film on the basis of the luminance information signal and performing the exposing operation of the film, setting means for setting a comparative level on the basis of the luminance information signal, flash emitting means for emitting flash toward the object field in response to the start of the exposing operation by the control means, means for calculating the integrated value of at least a part of the light from the object field at any time in response to the start of the exposing operation by the control means, and stop means for detecting that the integrated value and the comparative level have assumed a predetermined relation and stopping the flash emitting operation of the flash emitting means.

12 Claims, 5 Drawing Sheets

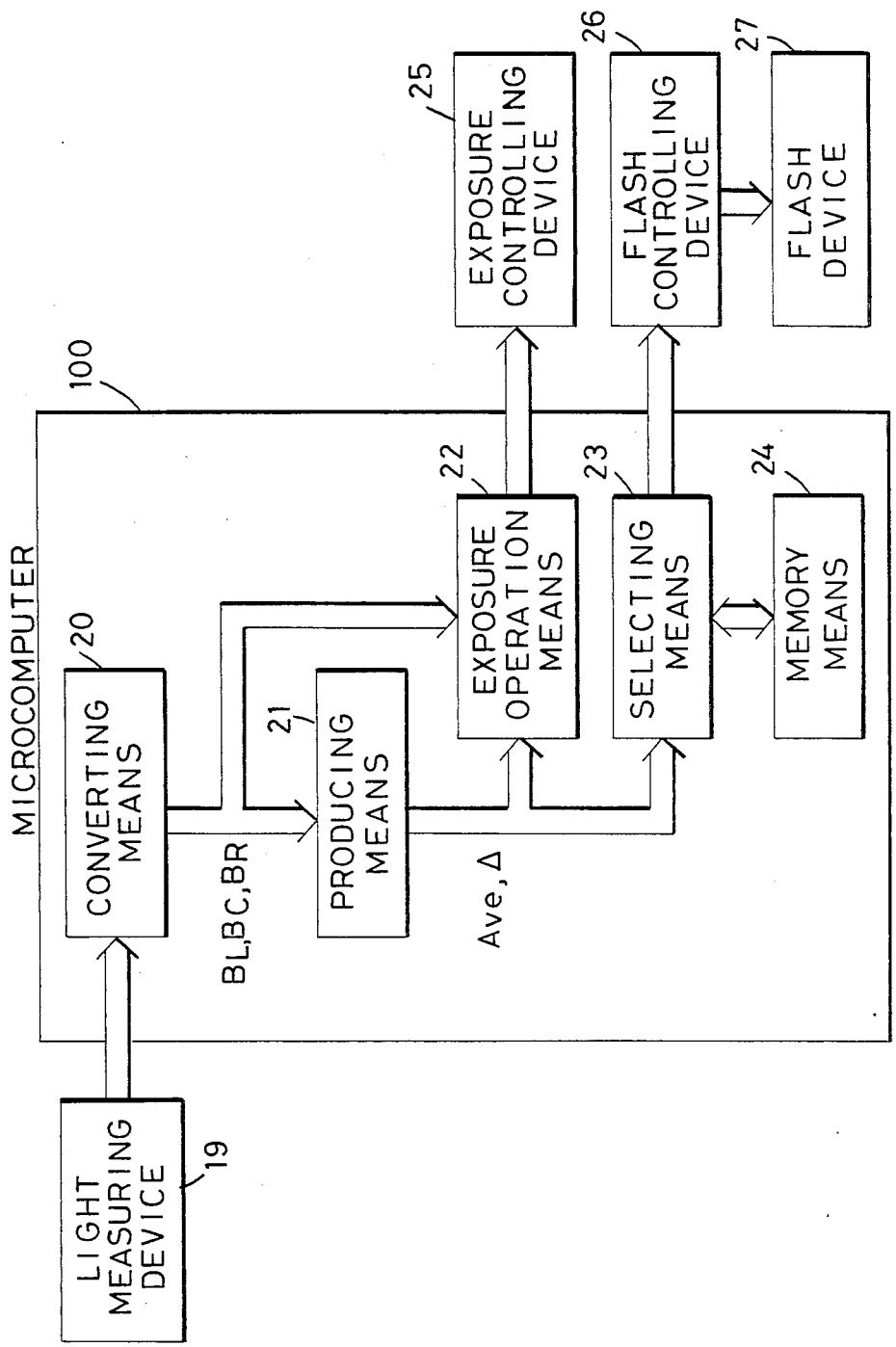

CAMERA

BACKGROUND OF THE INVENTION

1. Field of the Invention

The present invention relates to a camera designed to be capable of automatically accomplishing flash photography in the daylight.

2. Related Background Art

There has heretofore been known a technique of photometering steady light by a collective photometering system such as center priority photometry when determining the exposure, and as an improvement therein, there has also been put into practical use a technique of uniformly adding a predetermined value (e.g. 1 EV) to the exposure value simply calculated from the photometered value.

However, in the former of such prior techniques, there has been a problem that if the portion occupied in the picture plane by a main object to be photographed (a figure or the like) is great, the background of the main object to be photographed becomes over-exposed, and in the latter, improvements are effected in this regard, but where the main object to be photographed does not lie near the central portion of the picture plane, there has been a problem that the background of the main object to be photographed becomes under-exposed.

These problems are attributable to the fact that since the object field is collectively photometered, the object field cannot be classified.

Further, with regard also to the control of the amount of flash, in daytime synchro photography, it is controlled by the sum of the steady light and the flash and therefore, classification of the object field is indispensable and accordingly, it has been a fact that satisfactory automatic daytime synchro photography could not be accomplished.

SUMMARY OF THE INVENTION

It is an object of the present invention to provide a camera designed such that in flash photography in the daylight, proper steady light exposure and flash can always be automatically obtained in various scenes.

BRIEF DESCRIPTION OF THE DRAWINGS

FIGS. 3A and 3B are block diagrams showing the first embodiment of the present invention.

DESCRIPTION OF THE PREFERRED EMBODIMENTS

Figure 1:
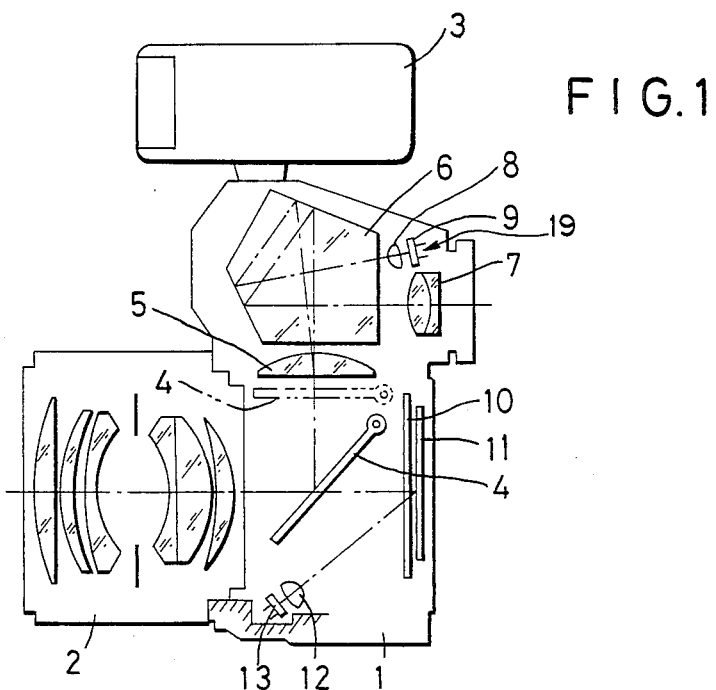
FIG. 1 is a schematic view of a single lens reflex camera according to first embodiment of the present invention.

As shown in FIG. 1, invention may be embodied in a single lens reflex camera.

Figure 2:
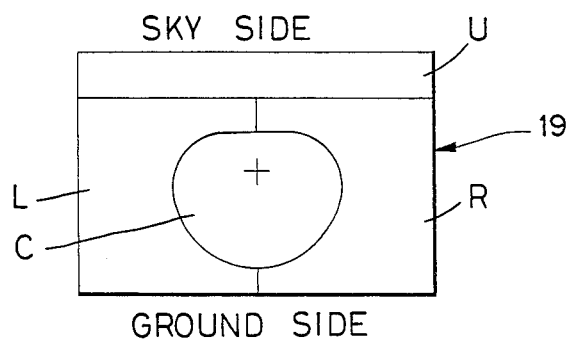
FIG. 2 shows the divided state of the object field according to the first embodiment of the present invention.

When a photographing operation is not being performed, a light beam (in this case, a steady light) passed through a photo-taking lens structure 2 is reflected by the mirror 4, indicated by solid lines, of a single lens reflex camera body 1 and passes through a focusing screen 5 and a pentaprism 6, and a part of the light beam is directed to an eyepiece 7 and another part of the light beam is directed to light measuring means 19 having a condensing lens 8 and a light-receiving element 9. The light measuring means 19 has its picture plane (the object field) divided into four areas L, C, R and U as shown in FIG. 2, and is designed to measure the light in the three areas except the area U.

During the photographing operation of the camera, the mirror 4 is moved to a position indicated by broken lines, and both the light emitted from a flash device 3 and reflected and returned by an object to be photographed and the steady light pass through the phototaking lens structure 2 and arrive at a film surface 11 because the mirror 4 is retracted. This light is then reflected by the film surface 11 and directed to light measuring means for a photographing operation which comprises a condensing lens 12 and a light-receiving element 13.

FIG. 3A is a block diagram showing the construction of a camera of the present invention. The light measuring means 19 cooperates with the light-receiving element 9 to logarithmically compress the three output currents $I_L$, $I_C$ and $I_R$ (the suffixes correspond to the divided three areas L, C and R, respectively) and output them to the converting means 20 of a microcomputer 100. The converting means 20, as shown in U.S. Pat. No. 4,636,054, corrects the outputs of the element 9 corresponding to the current $I_L$, $I_C$ and $I_R$ in accordance with the open F-value of the phototaking lens 2 and converts them into luminance values $B_L$, $B_C$ and $B_R$.

The microcomputer 100 further has producing means 21 for producing the mean luminance value Ave and the maximum luminance difference $\Delta$ which are the luminance information of the object field represented by equations (1) and (2) below, exposure operation means 22 for calculating the exposure value to be described, and selecting means 23 for selecting one level from among a plurality of comparative levels stored in memory means 24. MAX ($B_L$, $B_C$, $B_R$) indicate the maximum values of $B_L$, $B_C$, $B_R$ and MIN ($B_L$, $B_C$, $B_R$) indicate the minimum values of $B_L$, $B_C$, $B_R$.

$$\text{Ave}=(B_L+B_{CA}+B_R)/3 \qquad (1)$$

$$\Delta=\text{MAX}(B_L,B_C,B_R)-\text{MIN}(B_L,B_C,B_R) \qquad (2)$$

The exposure operation means 22 is means for subjecting the luminance values $B_L$, $B_C$ and $B_R$ to high luminance limit processing which will later be described, converting them into $B_L(*)$, $B_C(*)$ and $B_R(*)$ and determining the exposure value therefrom, and has an exposure controlling device connected thereto. The exposure value refers to an amount determined from a combination of the aperture value controlled during photography and the speed value of the shutter. The high luminance limit processing is the processing for keeping the luminance values $B_L$, $B_C$ and $B_R$ within a predetermined range and accordingly, when the luminance values exceed the predetermined range, the luminance values are converted into the maximum value of the predetermined range.

The selecting means 23 reads out data conforming to $\Delta$ and Ave from the memory means 24, and the read-out data is output to a flash controlling device 26. The flash controlling device 26 has the light-receiving element 13, and integrates the output of the light-receiving element 13 and compares the integrated value (the exposure amount) with a comparative level.

The output of the light-receiving element 13 is the sum of the steady light and the flash, and the comparative level is set up to determine the stopping of the flash.

Figure 3B:
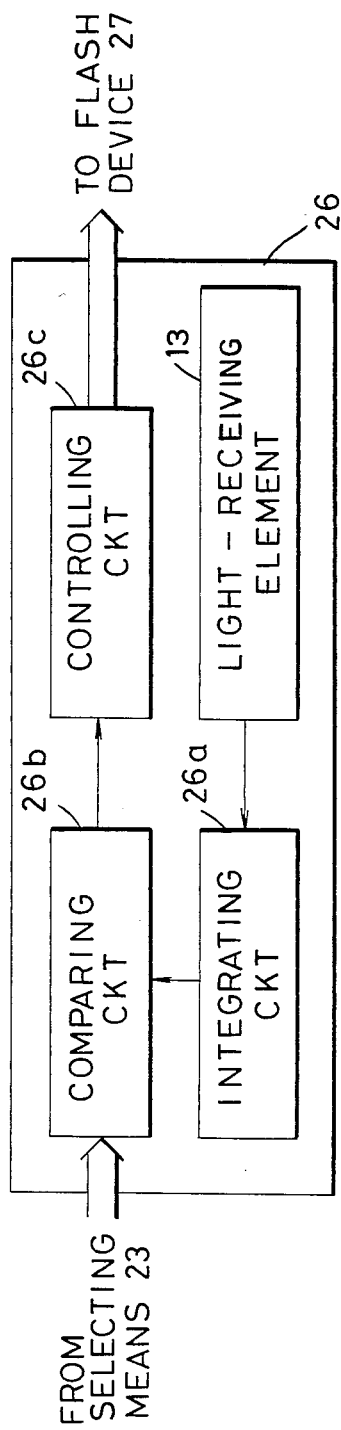

FIG. 3B shows the construction of the flash controlling device 26. An integrating circuit 26a integrates the output of a light-receiving element 13 and outputs the integrated value to a comparing circuit 26b. The comparing circuit 26b compares the comparative level selected by the selecting means 23 with the output of the integrating circuit 26b, and outputs a signal to a controlling circuit 26c when the two are coincident with each other. The controlling circuit 26c is responsive to the signal of the comparing circuit 26b to stop the flashing operation of a flash device 27. The controlling circuit 26c also controls the start of the flash emission of the flash device 27.

Figure 5:
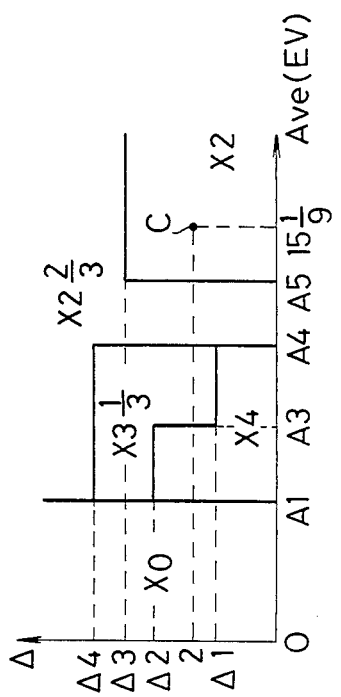
FIG. 5 shows a variation in the controlled state of flash photography.
Figure 4:
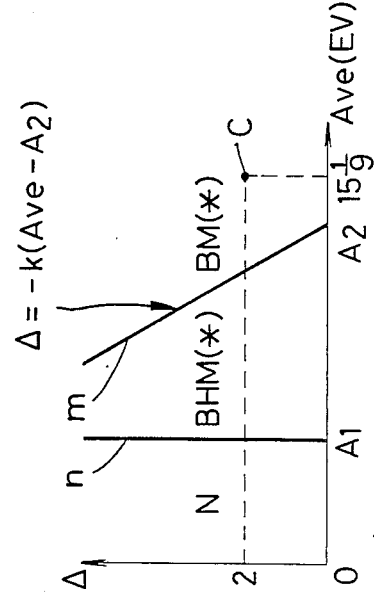
FIG. 4 shows a variation in the method of calculating the exposure value in the first embodiment of the present invention.

FIGS. 4 and 5 show graphs for determining the exposure value and the comparative level, respectively, with the mean luminance value Ave and the value of the maximum luminance difference $\Delta$ as parameters and these graphs have been empirically obtained.

First, FIG. 4 is a graph for the calculation of the exposure value, and it is divided into three zones N, BHM(*) and BM(*).

$A_1$ and $A_2$ and boundary lines n and m in this graph will now be described. Table 1 below shows the ranges of the values of $A_1$, $A_2$ and k.

TABLE 1

| $A_1$ (EV) | $A_2$ (EV) | k |
|---|---|---|
| 10 ± 1 | 14½ ± 1 | $1^{+1}_{-0.5}$ |

That is, $A_1$ is of a value of the order of ±1 with 10(EV) as the reference, and $A_2$ is of a value of the order of ±1 with 14½(EV) as the reference.

Also, the boundary line n is indicated by Ave=$A_1$, and the boundary line m is indicated by $\Delta = -k(\text{Ave} - A_2)$. The constant k assumes a value of the order of +1 or -0.5 with 1 as the reference.

The zone N is a zone in which the mean luminance value Ave is less than a predetermined value $A_1$ (of the order of 9-10 EV(ASA/ISO 100)), and this zone is outside the subject of automatic daylight synchro photography and is the ordinary flash photography area in the nighttime or in dark places such as indoor locations and accordingly, the aperture value and the shutter speed value assume predetermined values, respectively. The zone BM(*) shows the right-hand area with respect to the boundary line m as viewed in FIG. 4, and when this zone is selected, the exposure value is the mean value after the high luminance limit processing, $$BM(*) = \frac{B_L(*) + B_C(*) + B_R(*)}{3}.$$

Also, the zone BHM(*) shows the area between the boundary lines n and m, and when this zone is selected, the exposure value is the average value of the maximum luminance value BH(*) and the mean vlaue BM(*) after the high luminance limit processing, $$BHM(*) = \frac{BH(*) + BM(*)}{2}.$$

FIG. 5 is a graph for determining the comparative level, and this graph is divided into five zones X0, X2, X2⅔, X3⅓ and X4. For the determination of the comparative level, the selecting means 23 reads out data corresponding to the comparative level from the memory means 24 in accordance with the address in the memory means 24 determined by the value of Ave of the value of $\Delta$.

$A_3$-$A_5$ and $\Delta 1$-$\Delta 4$ in this graph will be shown below.

TABLE 2

| $A_3$ (EV) | $A_4$ (EV) | $A_5$ (EV) |
|---|---|---|
| about 12 | about 14 | about 14⅔ |

TABLE 3

| $\Delta 1$ | $\Delta 2$ | $\Delta 3$ | $\Delta 4$ |
|---|---|---|---|
| about 1 | about 2 | about 2½ | about 3 |

The zone X0, as in FIG. 4 is not the subject area of daylight synchro photography, but is the ordinary flash photography area in the nighttime or in dark places such as indoor locations. The comparative level in this zone is X0, and it is called the standard comparative level.

Assuming that the comparative levels of the zones X2, X2⅔, X3⅓ and X4 are expressed as X2, X2⅔, X3⅓ and X4, respectively, the suffixes represents the amounts of shift (EV) in the negative direction from the standard comparative level X0.

For example, assuming that $X0 = 0.1$ [l$_{x\cdot s}$], X2⅔ is $$X2⅔ = X0 \cdot 2^{-2⅔} = 0.016 [l_{x \cdot s}].$$

The values of An and $\Delta$n in FIGS. 4 and 5 are somewhat varied by the performance or the like of the light measuring optical system.

In the light measuring means 19, the output currents $I_L$, $I_C$ and $I_R$ from the light-receiving element 9 are logarithmically compressed and output to the converting means 20. The converting means 20 effects a correction conforming to the open F-value of the photo-taking lens 1 and converts said output currents into luminance values $B_L$, $B_C$ and $B_R$, which are output to the producing means 21 and the exposure operation means 22.

The exposure operation means 22 judges whether the luminance values $B_L$, $B_C$ and $B_R$ are greater than a predetermined luminance value (e.g. 15⅔EV(ASA/ISO 100)), and if the luminance values are greater than the predetermined luminance value, it substitutes the predetermined luminance value for said luminance values, and if the luminance values are less than the predetermined luminance value, it leaves said luminance values as they are. That is, the exposure operation means 22 effects the aforementioned high luminance limit processing. The respective luminance values after the high luminance limit processing are defined as $B_L(*)$, $B_C(*)$ and $B_R(*)$.

The mean luminance value Ave of the luminance values $B_L$, $B_C$ and $B_R$ and the maximum luminance difference $\Delta$ are calculated in the producing means, and an appropriate zone is selected by the selecting means 23.

This will be described more specifically.

Let it be assumed that when the camera has been turned on a certain scene, the luminance values measured by the light measuring means 19 are $B_L=16$ EV (hereinafter ASA/ISO 100 for all), $B_C=14$ EV and $B_R=15\frac{1}{3}$ EV.

From these luminance values, the mean luminance value Ave and the maximum luminance difference $\Delta$ may be found as follows:

$$Ave = \frac{16 + 14 + 15\frac{1}{3}}{3} = 15\frac{1}{9} [EV]$$

$$\Delta = 16 - 14 = 2[EV]$$

Assuming that in FIG. 5, these values Ave=15 1/9 and $\Delta=2$ correspond to point C, the exposure value and the predetermined exposure amount are selected to the zone BM(*) and the zone $2\frac{2}{3}$, respectively.

Assuming that the limit value of the high luminance limit processing is $15\frac{2}{3}$, $B_L=15\frac{2}{3}$ EV, $B_C=14$ EV and $B_R=15\frac{1}{3}$ EV and therefore, the exposure value is $$BM(*) = \frac{15\frac{2}{3} + 14 + 15\frac{1}{3}}{3} = 15[EV].$$

The exposure operation means 22 sets, for example, as the exposure value, the aperture value to 16 and the shutter speed to 1/125[S] (it is to be understood that this is within the speed light tuning speed), and outputs these to the exposure controlling device 25.

Also, by the selecting means 23, a value corresponding to the zone X2 determined by Ave=15 1/9 and $\Delta=2$, i.e., $$X2 = X_0 \cdot 2^{-2} = 0.025[l_x \cdot s],$$

is read out from the memory means 24.

When in this state, release is then effected, exposure is accomplished at an aperture value of 16 and a shutter speed of 1/125[S], and light emission is started by the flash device 27 with the shutter fully opened. The light emission is stopped at a point of time whereat the output of the light-receiving element 13 (the sum of the steady light and the flash) has reached a value integrated by the integrating circuit 26a, i.e., 0.025[$l_x \cdot s$]. Photographing is completed at a point of time whereat the shutter has been closed.

In flash photography in the daylight, it is necessary that the exposure determined by the shutter speed and the aperture value be adjusted to the background of the main object to be photographed. Accordingly, in the case of flash photography in the daylight, a good result will generally be obtained at high probability if exposure operation is performed by the average light measurement (in the present embodiment, BM(*)).

However, the tendency for the background to become over-exposed appears in the direction in which the mean luminance value Ave and the maximum luminance difference become smaller and therefore, in the present embodiment, an exposure operation (BHM(*)) in which importance is attached to a high luminance value is effected in this area.

In the present embodiment, the picture plane is divided into the four areas L, C, R and U as shown in FIG. 2, whereas the number of divisions is not limited to four.

Furthermore, description has been given with a TTL flash control type single lens reflex camera taken as an example, but this is not restrictive. The present invention is also applicable, for example, to lens shutter camera or the like in which light measurement is effected with the object field divided in the open air type.

Description will now be given of the division of the object field of FIG. 2 according to the first embodiment of the present invention.

Here, it is shown that the camera is in the standard supported state. Taking as an example a single lens reflex camera now commercially available, this means that the pentaprism lies above, that is, the camera is leveled in its horizontal position. The element surfaces of the light-receiving element 9 divided into three areas correspond to three areas except the sky side area U.

Also, the central area of the central portion in the four-division shape is of a mean shape between a circular shape and a heart-like shape, as shown. This is particularly effective in a case where the photographer selectively effects the light measurement of the central portion for a special composition, and the detailed shape thereof has been obtained by a simulation and an actual photographing experiment.

Figure 6:
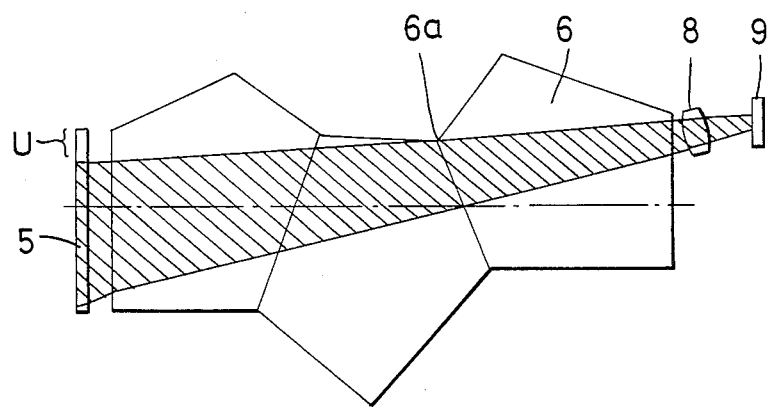
FIG. 6 shows the state of a part of a light beam in the division of the object field according to the first embodiment of the present invention.

FIG. 6 depicts, by hatching, a light beam, of the light beams passed through the focusing screen 5, which passes through the pentaprism 6 and the condensing lens 8 to the light-receiving element 9. The pentaprism 6 is shown developed for each reflecting surface.

As is clear from FIG. 6, where use is made of a pentaprism of such a shape as that of the present embodiment, the upper limit position through which a light beam can pass corresponds to the position of the portion 6a of the pentaprism 6.

Accordingly, by bringing down the portion 6a of the pentaprism 6 as viewed in FIG. 6, it is possible to form a portion which is not photometered by the focal plane of the focusing screen 5, namely, the sky side area U.

Dividing the object field into four areas in the standard supported state so as to photometer the three areas except the sky side area results in the following effects:

(1) Where the camera is brought into the standard supported state (the horizontal position):

Generally, the case where the main portion of the main object to be photographed lies in the sky side area U is nearly nil, and rather it is very often the case that the factors which make exposure improper, such as the sky and the sun, lie in the sky side area U. Accordingly, even if the sky side area U is normally cut so that light measurement is divisionally effected in the other three areas to thereby determine exposure, proper exposure will be obtained at very high probability.

Figure 7:
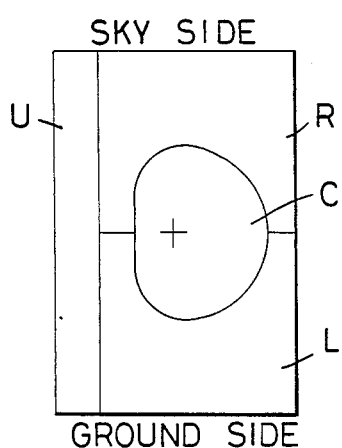
FIG. 7 shows the divided state of the picture plane in the vertical position of the camera according to the first embodiment of the present invention.

(2) Where the camera is rotated by $\frac{1}{4}$ turn about the optic axis of the photo-taking lens relative to the standard supported position (that is, brought into the vertical position) (FIG. 7):

FIG. 7 represents the divided state of the picture plane when the pentaprism has been turned on the left side, and in such case, the right-hand area R lies on the sky side.

Accordingly, where the factors which make exposure improper, such as the sky and the sun, lie in the right-hand area R (generally, such factors often exhibit outstandingly high luminance values as compared with the other areas), this information is deleted or substituted for by another value in the operation stage of the exposure value, whereby proper exposure can be obtained at very high probability.

This also holds true where the direction of the pentaprism is turned on the right side, which is opposite to FIG. 7. The portion which is not photometered, i.e., the sky side area U, lies not only on the sky side but also on the ground side, but it has been ascertained by an experiment that this hardly affects the determination of the exposure value because the ratio of the area to the whole is small and the position is near the left or right outer edge.

Thus, by the above-described construction, the factors which make exposure improper, such as the sky and the sun which are liable to lie on the sky side of the object field can be distinguished from the main object to be photographed at high probability and as a result, proper exposure can be obtained at very high probability.

Although in the first embodiment of the present invention, the area U of the divided object field is not photometered, the case as shown in the aforementioned U.S. Pat. No. 4,636,054 wherein a plurality of areas of the divided object field are all photometered is also applied to the camera shown in FIGS. 3A and 3B. Also, in the present embodiment, the object field is divided into a plurality of areas and photometered, but the design may be such that the luminance of the entire object field is measured and the comparative level is selected only by the magnitude of the value of that luminance.

Figure 8:
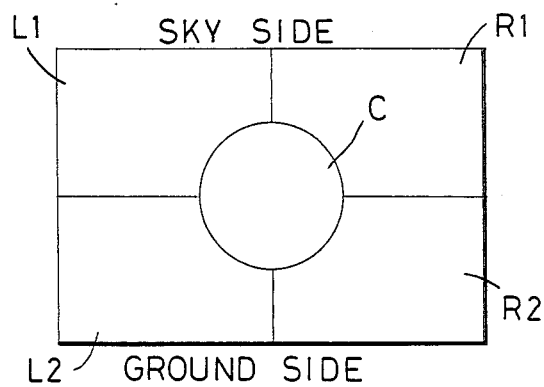
FIG. 8 shows the divided state of the object field in a modification of the present invention.
Figure 9:
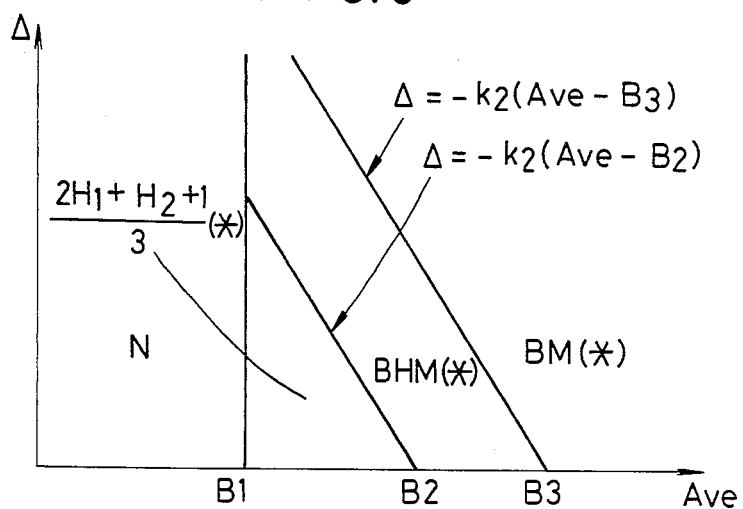
FIG. 9 shows a variation in the method of calculating the exposure value in the modification of the present invention.
Figure 10:
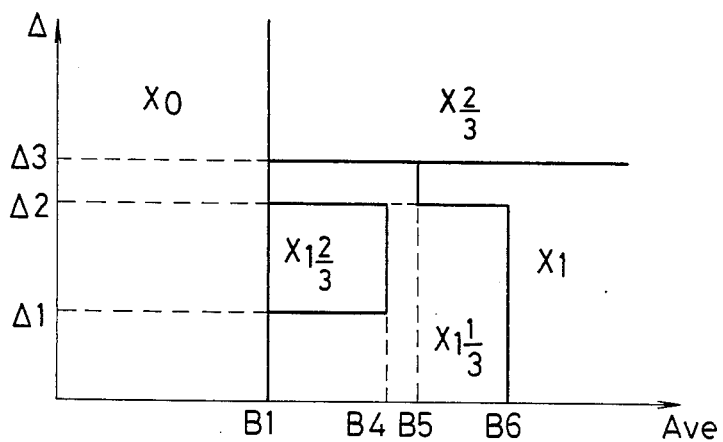
FIG. 10 shows a variation in the controlled state of flash photography in the modification of the present invention.

FIG. 8 shows a modification when the object field is divisionally photometered, and FIGS. 9 and 10 depict the graphs for determining the exposure value and the comparative level with the mean luminance value Ave and the value of the maximum luminance difference $\Delta$ in the modification of FIG. 8 as parameters, and these graphs have been empirically obtained. $H_1$ indicates the maximum luminance in the five areas L1, L2, R, R2 and C shown in FIG. 8, and $H_2$ indicates the second luminance in the five areas L1, L2, R1, R2 and C. FIG. 8, like FIG. 2, is in the standard supported state.

Values of parameters in FIGS. 9 and 10 are given in the following tables:

TABLE 4

| $B_1$ | $B_2$ | $B_3$ | $k_2$ |
| --- | --- | --- | --- |
| about 10½ | about 13½ | about 15½ | about 8/5 |

TABLE 5

| $B_4$ | $B_5$ | $B_6$ |
| --- | --- | --- |
| about 12½ | about 13½ | about 14½ |

TABLE 6

| $\Delta_1$ | $\Delta_2$ | $\Delta_3$ |
| --- | --- | --- |
| about 1½ | about 3½ | about 4 |

We claim:
1. A camera comprising:
   (a) measuring means for dividing an object field to be photographed into a plurality of areas, measuring luminances of at least some of said plurality of areas and producing a plurality of measurement outputs conforming to the luminances of said at least some areas;
   (b) producing means for producing a first information signal conforming to a maximum luminance difference and a second information signal conforming to a mean luminance value on the basis of said plurality of measurement outputs, said maximum luminance difference indicating a difference between a maximum value and a minimum value in the measured luminances corresponding to said at least some areas, said mean luminance value indicating a mean value of said measured luminances corresponding to said at least some areas;
   (c) control means for calculating an exposure value for exposure of a film on the basis of said plurality of measurement outputs corresponding to said at least some areas, and performing an exposing operation of the film;
   (d) memory means in which a plurality of comparative levels are stored;
   (e) selecting means for selecting one of said plurality of comparative levels on the basis of said first and second information signals;
   (f) flash emitting means for emitting flash toward the object field in response to the start of the exposing operation by said control means;
   (g) means for calculating an integrated value of at least a part of light from the object field at a time subsequent to the start of the exposing operation by said control means; and
   (h) stop means for detecting that said integrated value and said selected one of said plurality of comparative levels have assumed a predetermined relationship, and stopping the flash emitting operation of said flash emitting means.

2. A camera according to claim 1, wherein said control means has a plurality of states for calculating the exposure value, selects one of said plurality of states on the basis of said first and second information signals and calculates the exposure value on the basis of said plurality of measurement outputs in the selected one state.

3. A camera according to claim 2, wherein said selecting means selects the largest one of said plurality of comparative levels as the value indicated by said second information signal becomes larger when the luminance indicated by said second information signal is larger than a predetermined value.

4. A camera according to claim 3, wherein said control means calculates the exposure value on the basis of different equations in the respective ones of said plurality of states.

5. A camera comprising:
   (a) measuring means for dividing an object field to be photographed into a plurality of areas, measuring luminances of at least some of said plurality of areas and producing a plurality of measurement outputs conforming to the luminances of said at least some areas;

(b) producing means for producing a plurality of information signals each of which indicates different information with respect to the luminance distribution of the object field on the basis of said plurality of measurement outputs;

(c) control means for calculating an exposure value for exposure of a film on the basis of said plurality of information signals and said plurality of measurement outputs, and performing an exposing operation of the film on the basis of the calculated exposure value;

(d) determining means for determining a comparative level on the basis of said plurality of information signals;

(e) flash emitting means for emitting flash toward the object field in response to the start of the exposing operation by said control means;

(f) means for calculating an integrated value of at least a part of light from the object field at a time subsequent to the start of the exposing operation by said control means; and (g) stop means for detecting that said integrated value and said comparative level have assumed a predetermined relationship, and stopping the flash emitting operation of said flash emitting means.

6. A camera according to claim 5, wherein said control means has a plurality of states for calculating the exposure value, selects one of said plurality of states on the basis of said plurality of information signals and calculates the exposure value on the basis of said plurality of measurement outputs in the selected one state.

7. A camera according to claim 6, wherein said plurality of information signals has a signal conforming to a maximum luminance difference indicating a difference between a maximum value and a minimum value in the measured luminances corresponding to said at least some areas.

8. A camera according to claim 7, wherein said plurality of information signals have a signal conforming to a mean luminance value indicating a mean value of said measured luminances corresponding to said at least some areas.

9. A camera comprising:

(a) measuring means for dividing an object field to be photographed into a plurality of areas, measuring luminances of at least some of said plurality of areas and producing a plurality of measurement outputs conforming to the luminance of said at least some areas;

(b) producing means for producing a plurality of information signals each of which indicates different information with respect to the luminance distribution of the object field on the basis of said plurality of measurement outputs;

(c) control means for calculating an exposure value for exposure of a film on the basis of said plurality of information signals and said plurality of measurement outputs, and performing an exposing operation of the film on the basis of the calculated exposure value;

(d) flash emitting means for emitting flash toward the object field in response to the start of the exposing operation by said control means;

(e) means for calculating an integrated value of at least a part of light from the object field at a time subsequent to the start of the exposing operation by said control means;

(f) stop means for detecting that said integrated value and a comparative level have assumed a predetermined relationship, and stopping the flash emitting operation of said flash emitting means; and (g) changing means for changing said comparative level on the basis of said plurality of information signals.

10. A camera according to claim 9, wherein said control means has a plurality of states for calculating the exposure value, selects one of said plurality of states on the basis of said plurality of information signals and calculates the exposure value on the basis of said plurality of measurement outputs in the selected one state.

11. A camera according to claim 10, wherein said plurality of information signals have a signal conforming to a maximum luminance difference indicating a difference between a maximum value and a minimum value in the measured luminances corresponding to said at least some areas.

12. A camera according to claim 11, wherein said plurality of information signals have a signal conforming to a mean luminance value indicating a mean value of said measured luminances corresponding to said at least some areas.

* * * * *